(12) United States Patent
Wu et al.

(10) Patent No.: US 11,439,974 B2
(45) Date of Patent: Sep. 13, 2022

(54) METHOD FOR PREPARING HIGH-ABSORPTIVITY SILICA AS LUTEIN CARRIER

(71) Applicant: SHANDONG LINK SCIENCE AND TECHNOLOGY CO., LTD., Weifang (CN)

(72) Inventors: Xiaolin Wu, Weifang (CN); Jinxing Hu, Weifang (CN); Haiming Gao, Weifang (CN); Hongxin Xu, Weifang (CN); Xiangkai Li, Weifang (CN); Pin Li, Weifang (CN)

(73) Assignee: SHANDONG LINK SCIENCE AND TECHNOLOGY CO., LTD., Weifang (CN)

( * ) Notice: Subject to any disclaimer, the term of this patent is extended or adjusted under 35 U.S.C. 154(b) by 234 days.

(21) Appl. No.: 16/766,729

(22) PCT Filed: May 7, 2019

(86) PCT No.: PCT/CN2019/085756
§ 371 (c)(1),
(2) Date: May 25, 2020

(87) PCT Pub. No.: WO2020/140359
PCT Pub. Date: Jul. 9, 2020

(65) Prior Publication Data
US 2021/0229067 A1    Jul. 29, 2021

(30) Foreign Application Priority Data

Jan. 3, 2019    (CN) .......................... 201910005531.2

(51) Int. Cl.
*B01J 20/10* (2006.01)
*B01J 20/28* (2006.01)
(Continued)

(52) U.S. Cl.
CPC ....... *B01J 20/103* (2013.01); *B01J 20/28061* (2013.01); *B01J 20/28073* (2013.01);
(Continued)

(58) Field of Classification Search
None
See application file for complete search history.

(56) References Cited

U.S. PATENT DOCUMENTS

2009/0143490 A1* 6/2009 Masuda .............. C01B 33/1485
516/34

FOREIGN PATENT DOCUMENTS

CN    106185956 A    12/2016
CN    107055557 A    8/2017
(Continued)

*Primary Examiner* — Colin W. Slifka
*Assistant Examiner* — Michael Forrest

(57) ABSTRACT

The invention discloses a preparation method of high-absorptivity silica as lutein carrier. The method includes adding sodium silicate into a synthesis kettle, introducing steam for heating while stirring, adding water, stirring for reaction to obtain a reaction substrate A, and adding sulfuric acid to the reaction substrate A to obtain reaction solution B; simultaneously adding sulfuric acid and sodium silicate into the reaction solution B, performing synthesis reaction for a given period of time, stopping feeding of sodium silicate, adding sulfuric acid only for post-acidification, and aging to obtain dilute slurry D; and filtering the dilute slurry D, washing, slurrying, drying and packaging to obtain silica microspheres as lutein carrier. The invention accurately controls each process so that the prepared high-absorptivity silica as lutein carrier has high adsorption and good dispersibility and flowability after adsorbing lutein.

6 Claims, 1 Drawing Sheet

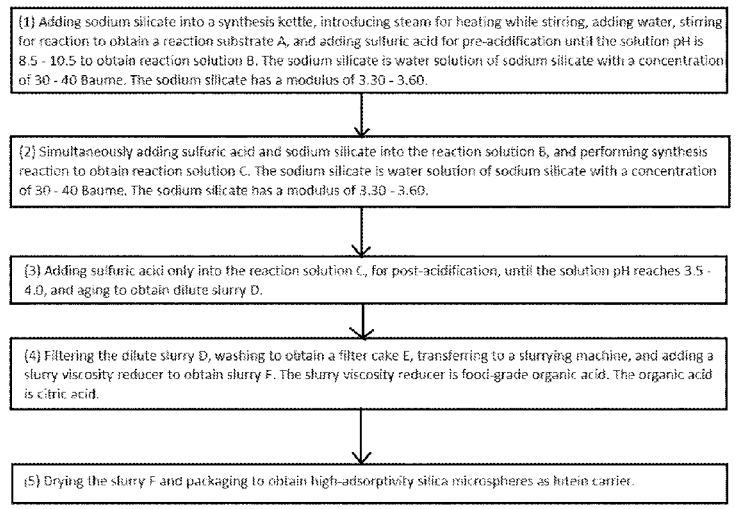

(51) Int. Cl.
*B01J 20/30* (2006.01)
*C01B 33/193* (2006.01)
*A23K 20/179* (2016.01)
*A23K 20/28* (2016.01)

(52) U.S. Cl.
CPC ......... *B01J 20/3071* (2013.01); *C01B 33/193* (2013.01); *A23K 20/179* (2016.05); *A23K 20/28* (2016.05); *C01P 2006/12* (2013.01); *C01P 2006/14* (2013.01); *C01P 2006/19* (2013.01); *C01P 2006/80* (2013.01)

(56) References Cited

FOREIGN PATENT DOCUMENTS

| CN | 106185956 B | * | 12/2017 | |
| CN | 108516559 A | * | 9/2018 | ............... A61K 8/25 |
| CN | 108516559 A | | 9/2018 | |
| CN | 10891274 A | | 11/2018 | |
| CN | 109678165 A | | 4/2019 | |
| DE | 10124298 A1 | * | 11/2002 | ........... A23K 1/1756 |
| WO | 2018114280 A1 | | 6/2018 | |
| WO | 2018202755 A1 | | 11/2018 | |

\* cited by examiner (1) Adding sodium silicate into a synthesis kettle, introducing steam for heating while stirring, adding water, stirring for reaction to obtain a reaction substrate A, and adding sulfuric acid for pre-acidification until the solution pH is 8.5 - 10.5 to obtain reaction solution B. The sodium silicate is water solution of sodium silicate with a concentration of 30 - 40 Baume. The sodium silicate has a modulus of 3.30 - 3.60.

↓

(2) Simultaneously adding sulfuric acid and sodium silicate into the reaction solution B, and performing synthesis reaction to obtain reaction solution C. The sodium silicate is water solution of sodium silicate with a concentration of 30 - 40 Baume. The sodium silicate has a modulus of 3.30 - 3.60.

↓

(3) Adding sulfuric acid only into the reaction solution C, for post-acidification, until the solution pH reaches 3.5 - 4.0, and aging to obtain dilute slurry D.

↓

(4) Filtering the dilute slurry D, washing to obtain a filter cake E, transferring to a slurrying machine, and adding a slurry viscosity reducer to obtain slurry F. The slurry viscosity reducer is food-grade organic acid. The organic acid is citric acid.

↓

(5) Drying the slurry F and packaging to obtain high-adsorptivity silica microspheres as lutein carrier.

METHOD FOR PREPARING HIGH-ABSORPTIVITY SILICA AS LUTEIN CARRIER

RELATED APPLICATIONS

This application is a U.S. national phase application of the International Application PCT/CN2019/085756 filed May 7, 2019, which claims the benefit of the Chinese Patent Application CN201910005531.2 filed Jan. 3, 2019 and issued Jan. 14, 2020 as the Chinese Patent ZL201910005531.2, each of which is incorporated herein by reference in its entirety.

FIELD OF THE INVENTION

The present invention relates to the field of silica preparation, in particular to a preparation method of high-absorptivity silica as lutein carrier.

BACKGROUND OF THE INVENTION

With the requirements of people for colors of animal products, the nutrition research has been focused not only on promotion of livestock/poultry/aquatic product growth, but also more on how to improve the quality of livestock/poultry/aquatic products such as color, aroma, taste and nutrition. Its goal is to add lutein pigments into feed so as to meet the needs of customers. Lutein in the feed is mainly used for coloring the skin, shanks, egg yolk and belly fat of poultry and aquatic products such as yellow croakers, soft-shelled turtles, yellow catfish, channel catfish, shrimps and crabs. The lutein currently available in the market mainly comes from deep processed marigold flowers. The marigold flowers are subjected to a low temperature extraction process to obtain a product in the form of viscous oily liquid, which can be carried on silica and then proportionally dispersed in feed. In application, most silica has problems such as poor adsorption and flowability and nonuniform distribution of adsorbed lutein, and is easy to adhere and agglomerate during production and storage, resulting in processing machine clogging to exert a strong impact on the quality of a lutein product. As a consequence, the product is hardly dispersed in premix, which restricts the development of the industry. These defects greatly limit the use of silica as carrier. The poor absorptivity and flowability can be made up only by reducing the product moisture to the equipment limit, which results in a high cost of the product. At present, silica is prepared mainly by a precipitation or gas phase process. Because of inexpensive readily-available raw materials, simple production process and equipment and low product price, the precipitation process occupies a dominant position. It includes preparing dilute solution from industrial water glass, adding acid to precipitate silica, washing, filtering, drying and crushing to obtain silica. The silica carrier used in the lutein industry currently has an appearance of fine powder, wide particle size distribution and poor flowability. Since the silica product has a pore volume lower than 0.7, its surface is sticky and easy to agglomerate after lutein adsorption. Therefore, it is necessary to prepare high-absorptivity silica with narrow particle size distribution, good flowability, large pore volume, good adsorption and no agglomeration to serve as lutein carrier.

OBJECTS AND SUMMARY OF THE INVENTION

In order to solve the problems mentioned above, the present invention discloses a preparation method of high-absorptivity silica as lutein carrier. The method includes (1) adding sodium silicate into a synthesis kettle, introducing steam for heating while stirring, adding water, stirring for reaction to obtain a reaction substrate A, and adding sulfuric acid for pre-acidification until the solution pH is 8.5-10.5 to obtain reaction solution B; (2) simultaneously adding sulfuric acid and sodium silicate into the reaction solution B, and performing synthesis reaction to obtain reaction solution C; (3) adding sulfuric acid only into the reaction solution C, for post-acidification until the solution pH reaches 3.5-4.0, and aging to obtain dilute slurry D; (4) filtering the dilute slurry D, washing to obtain a filter cake E, transferring to a slurrying machine, and adding a slurry viscosity reducer to obtain slurry F; and (5) drying the slurry F and packaging to obtain high-absorptivity silica microspheres as lutein carrier.

The sodium silicate in steps (1) and (2) is water solution of sodium silicate with a concentration of 30-40 Baume, and has a modulus of 3.30-3.60.

In step (1), the feeding amount of the sodium silicate is 4-8.0 $m^3$, and the concentration of the sodium silicate in the reaction substrate A is 15-20 Baume; the sulfuric acid is water solution of sulfuric acid with a mass fraction of 15-30%, and the feeding speed and feeding time of the sulfuric acid are 15 $m^3/h$ and 10-30 min, respectively; the reaction temperature is 30-60° C.; and the stirring speed is 45-80 rpm.

In step (2), the sulfuric acid is water solution of sulfuric acid with a mass fraction of 93-99%, the feeding speed of the sulfuric acid is 0.6 $m^3/h$, the feeding speed of the sodium silicate is 4-8 $m^3/h$, the feeding time of the sulfuric acid and the sodium silicate is 30-60 min, and the reaction temperature is 75-95° C.

In step (3), the sulfuric acid is water solution of sulfuric acid with a mass fraction of 93-99%, the feeding speed of the sulfuric acid is 50-75% that in step (2), the feeding time is 15-30 min, the reaction temperature is 75-95° C. and the aging time is 15-30 min.

In step (4), the slurry viscosity reducer is food-grade organic acid, preferably, citric acid; and the discharged water electrical conductivity of washing water in the washing process is 3.0-8.0 ms/cm.

In step (5), the drying method involves drying at an atomization rotation speed in a centrifugal drying tower; the centrifugal drying tower has an inlet temperature of 450-550° C., an outlet temperature of 110-150° C. and a pressure of −150-−50 Pa; the rotation speed of the atomizer is 5,000-9,000 rpm; and the packaging step is performed by a vacuum packaging machine under a pressure of −300-−100 Pa.

The present invention has the following advantages:
  (1) The prepared silica has large pore volume, high absorptivity and stable structure by controlling the process parameters in each step of the synthesis process, such as concentrations of sodium silicate and sulfuric acid, substrate concentration and synthesis time.
  (2) The food-grade organic acid used in the present invention ensures good silica safety and hardness.
  (3) The drying step in the present invention is performed at the atomization rotation speed in the centrifugal drying tower to realize a narrow particle size distribution of the prepared product by controlling the rotation speed of the atomizer; and fine dust is effectively removed from the product by the vacuum packaging.
  (4) By accurate control on each process mentioned above, the prepared high-absorptivity silica as lutein carrier has high adsorption and good dispersibility and flowability after adsorbing lutein.

BRIEF DESCRIPTION OF FIGURES

FIG. 1 is a flowchart visualizing an embodiment of the present invention.

BRIEF DESCRIPTION OF FIGURES

FIG. 1 is a flowchart visualizing an embodiment of the present invention.

DETAILED DESCRIPTION OF THE EMBODIMENTS

Hereinafter, the technical solutions in the embodiments of the present invention will be described clearly and completely in conjunction with FIG. 1 in the embodiments of the present invention. The described embodiments are only part of the embodiments of the present invention, rather than all of them.

Example 1

A preparation method of high-absorptivity silica as lutein carrier includes (1) adding sodium silicate into a synthesis kettle, introducing steam for heating while stirring, adding water, stirring for reaction to obtain a reaction substrate A, and adding sulfuric acid for pre-acidification until the solution pH is 10.0 to obtain reaction solution B; (2) simultaneously adding sulfuric acid and sodium silicate into the reaction solution B, and performing synthesis reaction to obtain reaction solution C; (3) adding sulfuric acid only into the reaction solution C, for post-acidification, until the solution pH reaches 4.0, and aging to obtain dilute slurry D; (4) filtering the dilute slurry D, washing to obtain a filter cake E, transferring to a slurrying machine, and adding a slurry viscosity reducer to obtain slurry F; and (5) drying the slurry F and packaging to obtain silica microspheres as lutein carrier, which is a uniform coarse powder-like silica product.

The sodium silicate in steps (1) and (2) is water solution of sodium silicate with a concentration of 30 Baume, and has a modulus of 3.30.

In step (1), the feeding amount of the sodium silicate is 8.0 $m^3$, and the concentration of the sodium silicate in the reaction substrate A is 20 Baume; the sulfuric acid is water solution of sulfuric acid with a mass fraction of 30%, and the feeding speed and feeding time of the sulfuric acid are 15 $m^3/h$ and 25 min, respectively; the reaction temperature is 60° C.; and the stirring speed is 72 rpm.

In step (2), the sulfuric acid is water solution of sulfuric acid with a mass fraction of 98%, the feeding speed of the sulfuric acid is 0.6 $m^3/h$, the feeding speed of the sodium silicate is 8 $m^3/h$, the feeding time of the sulfuric acid and the sodium silicate is 60 min, and the reaction temperature is 95° C.

In step (3), the sulfuric acid is water solution of sulfuric acid with a mass fraction of 98%, the feeding speed of the sulfuric acid is 0.3 $m^3/h$, the feeding time is 30 min, the reaction temperature is 95° C. and the aging time is 30 min.

In step (4), the slurry viscosity reducer is citric acid with the feeding amount of 8.0 Kg, pH of the slurry F is 6.5, and the discharged water electrical conductivity of washing water is 3.0 ms/cm.

In step (5), the drying method involves drying at an atomization rotation speed in a centrifugal drying tower; the centrifugal drying tower has an inlet temperature of 500° C., an outlet temperature of 120° C. and a pressure of −100 Pa; the rotation speed of the atomizer is 9,000 rpm; and the packaging step is performed by a vacuum packaging machine under a pressure of −100 Pa.

Example 2

A preparation method of high-absorptivity silica as lutein carrier includes (1) adding sodium silicate into a synthesis kettle, introducing steam for heating while stirring, adding water, stirring for reaction to obtain a reaction substrate A, and adding sulfuric acid for pre-acidification until the solution pH is 10.0 to obtain reaction solution B; (2) simultaneously adding sulfuric acid and sodium silicate into the reaction solution B, and performing synthesis reaction to obtain reaction solution C; (3) adding sulfuric acid only into the reaction solution C, for post-acidification until the solution pH reaches 4.0, and aging to obtain dilute slurry D; (4) filtering the dilute slurry D, washing to obtain a filter cake E, transferring to a slurrying machine, and adding a slurry viscosity reducer to obtain slurry F; and (5) drying the slurry F and packaging to obtain silica microspheres as lutein carrier, which is a uniform coarse powder-like silica product.

The sodium silicate in steps (1) and (2) is water solution of sodium silicate with a concentration of 38 Baume, and has a modulus of 3.60.

In step (1), the feeding amount of the sodium silicate is 8.0 $m^3$, and the concentration of the sodium silicate in the reaction substrate A is 20 Baume; the sulfuric acid is water solution of sulfuric acid with a mass fraction of 30%, and the feeding speed and feeding time of the sulfuric acid are 15 $m^3/h$ and 25 min, respectively; the reaction temperature is 40° C.; and the stirring speed is 72 rpm.

In step (2), the sulfuric acid is water solution of sulfuric acid with a mass fraction of 98%, the feeding speed of the sulfuric acid is 0.6 $m^3/h$, the feeding speed of the sodium silicate is 8 $m^3/h$, the feeding time of the sulfuric acid and the sodium silicate is 60 min, and the reaction temperature is 85° C.

In step (3), the sulfuric acid is water solution of sulfuric acid with a mass fraction of 98%, the feeding speed of the sulfuric acid is 0.3 $m^3/h$, the feeding time is 30 min, the reaction temperature is 85° C. and the aging time is 30 min.

In step (4), the slurry viscosity reducer is citric acid with the feeding amount of 8.0 Kg, pH of the slurry F is 6.4, and the discharged water electrical conductivity of washing water is 3.0 ms/cm.

In step (5), the drying method involves drying at an atomization rotation speed in a centrifugal drying tower; the centrifugal drying tower has an inlet temperature of 500° C., an outlet temperature of 140° C. and a pressure of −150 Pa; the rotation speed of the atomizer is 5,500 rpm; and the packaging step is performed by a vacuum packaging machine under a pressure of −200 Pa.

Example 3

A preparation method of high-absorptivity silica as lutein carrier includes (1) adding sodium silicate into a synthesis kettle, introducing steam for heating while stirring, adding water, stirring for reaction to obtain a reaction substrate A, and adding sulfuric acid for pre-acidification until the solution pH is 9.0 to obtain reaction solution B; (2) simultaneously adding sulfuric acid and sodium silicate into the reaction solution B, and performing synthesis reaction to obtain reaction solution C; (3) adding sulfuric acid only into the reaction solution C, for post-acidification until the solution pH reaches 3.8, and aging to obtain dilute slurry D; (4) filtering the dilute slurry D, washing to obtain a filter cake E, transferring to a slurrying machine, and adding a slurry viscosity reducer to obtain slurry F; and (5) drying the slurry F and packaging to obtain silica microspheres as lutein carrier, which is a uniform coarse powder-like silica product.

The sodium silicate in steps (1) and (2) is water solution of sodium silicate with a concentration of 30 Baume, and has a modulus of 3.60.

In step (1), the feeding amount of the sodium silicate is 9.0 m$^3$, and the concentration of the sodium silicate in the reaction substrate A is 17.0 Baume; the sulfuric acid is water solution of sulfuric acid with a mass fraction of 60%, and the feeding speed and feeding time of the sulfuric acid are 15 m$^3$/h and 25 min, respectively; the reaction temperature is 50° C.; and the stirring speed is 47 rpm.

In step (2), the sulfuric acid is water solution of sulfuric acid with a mass fraction of 98%, the feeding speed of the sulfuric acid is 0.6 m$^3$/h, the feeding speed of the sodium silicate is 7.0 m$^3$/h, the feeding time of the sulfuric acid and the sodium silicate is 55 min, and the reaction temperature is 80° C.

In step (3), the sulfuric acid is water solution of sulfuric acid with a mass fraction of 98%, the feeding speed of the sulfuric acid is 0.3 m$^3$/h, the feeding time is 35 min, the reaction temperature is 85° C. and the aging time is 20 min.

In step (4), the slurry viscosity reducer is citric acid with the feeding amount of 8.0 Kg, pH of the slurry F is 6.3, and the discharged water electrical conductivity of washing water is 4.0 ms/cm.

In step (5), the drying method involves drying at an atomization rotation speed in a centrifugal drying tower; the centrifugal drying tower has an inlet temperature of 500° C., an outlet temperature of 130° C. and a pressure of −100 Pa; the rotation speed of the atomizer is 7,800 rpm; and the packaging step is performed by a vacuum packaging machine under a pressure of −100 Pa.

Comparative Example 1

A preparation method of high-absorptivity silica as lutein carrier is basically the same as that in Example 1, with the only difference that the modulus of sodium silicate is 2.90.

Comparative Example 2

A preparation method of high-absorptivity silica as lutein carrier is basically the same as that in Example 4, with the only difference that the slurry viscosity reducer is polyacrylic acid.

The performances of high-absorptivity silica as lutein carrier prepared in Examples 1-3 and Comparative Examples 1-2 are tested and the results are shown in the following tables:

TABLE 1

| | DBP Absorption (mL/g) | Bulk Specific Weight | Water Absorption (%) |
|---|---|---|---|
| Example 1 | 3.10 | 0.21 | 230 |
| Example 2 | 2.96 | 0.225 | 215 |
| Example 3 | 3.03 | 0.215 | 230 |
| Comparative Example 1 | 2.85 | 0.235 | 205 |

From Table 1, it can be seen that the high-absorptivity silica as lutein carrier provided by the present invention has high DBP absorption, small bulk specific weight and high water absorption.

TABLE 2

| | 105° C. Heating Loss (%) | 1,000° C. Loss on Ignition (%) | Lutein Absorption (%) |
|---|---|---|---|
| Example 1 | 4.7 | 3.9 | 250 |
| Example 2 | 4.4 | 4.3 | 235 |
| Example 3 | 4.6 | 4.0 | 245 |
| Comparative Example 2 | 5.0 | 4.7 | 218 |

From Table 2, it can be seen that the high-absorptivity silica as lutein carrier prepared in Examples 1-3 of the present invention has good stability and higher lutein absorption than that in Comparative Example 2.

TABLE 3

| | BET Specific Surface Area (m$^2$/g) | Silica Content (%) | Pore Volume of Product (mL/g) | Agglomeration |
|---|---|---|---|---|
| Example 1 | 215 | 97.8 | 0.96 | No |
| Example 2 | 240 | 98.2 | 1.15 | No |
| Example 3 | 227 | 97.3 | 1.06 | No |

From Table 3, it can be seen that the high-absorptivity silica as lutein carrier provided by Examples 1-3 has large specific surface area and pore volume, high silica content, good dispersibility and no agglomeration.

Those mentioned above are only preferred embodiments of the present invention and are not intended to limit the present invention. Any modification, equivalent replacement, improvement and the like made within the spirit and principle of the present invention should be included in the protection scope of the present invention. In addition, the technical solution of each embodiment can be combined with each other on the basis that those skilled in the art can implement it. When mutual contradiction occurs in the combination of the technical solutions or the combination fails to be implemented, such combination should be considered as inexistent and falling out of the protection scope claimed by the present invention.

What is claimed is:

1. A method for preparing absorptive silica as lutein carrier, comprising the steps of:
   (1) adding sodium silicate into a synthesis kettle, introducing steam for heating while stirring, adding water, stirring for reaction to obtain a reaction substrate A, and adding sulfuric acid for pre-acidification until the solution pH is 8.5-10.5 to obtain reaction solution B;
   (2) simultaneously adding sulfuric acid and sodium silicate into the reaction solution B, and performing synthesis reaction to obtain reaction solution C;
   (3) adding sulfuric acid only into the reaction solution C, for post-acidification, until the solution pH reaches 3.5-4.0, and aging to obtain dilute slurry D;
   (4) filtering the dilute slurry D, washing to obtain a filter cake E, transferring to a slurrying machine, and adding a slurry viscosity reducer to obtain slurry F; and
   (5) drying the slurry F and packaging to obtain absorptive silica microspheres as lutein carrier, wherein:
   the sodium silicate has a modulus of 3.30-3.60;
   the slurry viscosity reducer is food-grade organic acid;
   the organic acid is citric acid; and in step (1):
the feeding amount of the sodium silicate is 4.0-8.0 m³;
the concentration of the sodium silicate in the reaction substrate A is 15-20 Baume;
the sulfuric acid is water solution of sulfuric acid with a mass fraction of 15-30%;
the feeding speed and feeding time of the sulfuric acid are, respectively, 15 m³/h and 10-30 minutes;
the reaction temperature is 30-60° C.; and
the stirring speed is 45-80 rpm.

2. The method in claim 1, wherein in step (2):
the sulfuric acid is water solution of sulfuric acid with a mass fraction of 93-99%;
the feeding speed of the sulfuric acid is 0.6 m³/h;
the feeding speed of the sodium silicate is 4-8 m³/h;
the feeding time of the sulfuric acid and the sodium silicate is 30-60 minutes; and
the reaction temperature is 75-95° C.

3. The method in claim 2, wherein in step (3):
the sulfuric acid is water solution of sulfuric acid with a mass fraction of 93-99%;
the feeding speed of the sulfuric acid is reduced to 50-75% of what is designated in step (2);
the feeding time is 30-60 minutes; and
the reaction temperature is 75-95° C. and the aging time is 15-30 minutes.

4. The method in claim 1, wherein:
the discharged water electrical conductivity of washing water in the washing process is 3.0-8.0 mS/cm; and
pH of the filter cake is 6-7.

5. The method in claim 1, wherein in step (5):
the drying method involves drying at an atomization rotation speed in a centrifugal drying tower;
the centrifugal drying tower has an inlet temperature of 450-550° C., an outlet temperature of 110-150° C. and a pressure of −150-−50 Pa; and
the rotation speed of the atomizer is 5,000-9,000 rpm.

6. The method in claim 1, wherein, in step (5), the packaging step is performed by a vacuum packaging machine under −300-−100 Pa.

* * * * *